Sept. 29, 1964 U. A. POMMERENING 3,151,300
NEGATIVE IMPEDANCE CIRCUIT
Filed Aug. 6, 1962 2 Sheets-Sheet 1
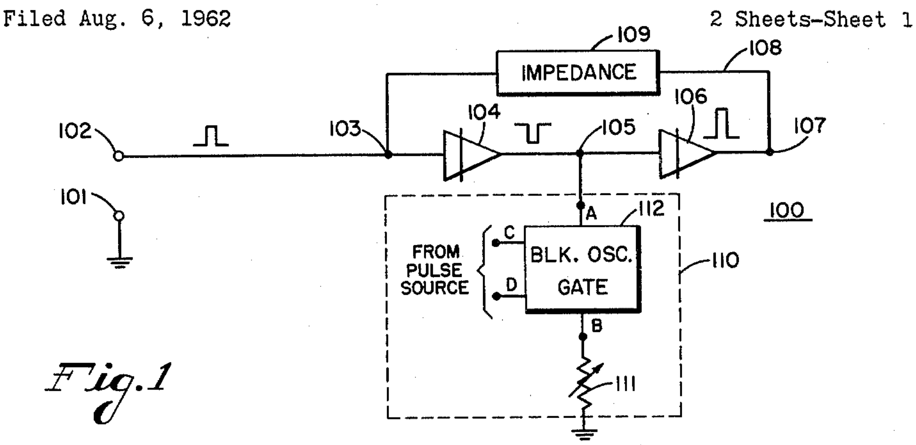
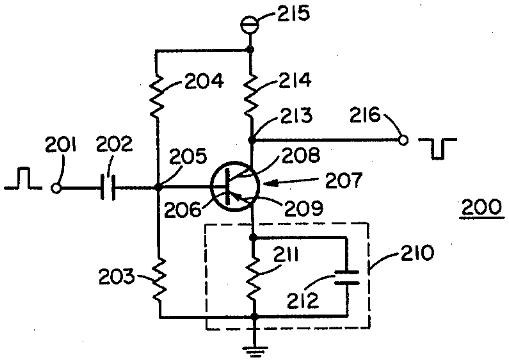
Fig. 2
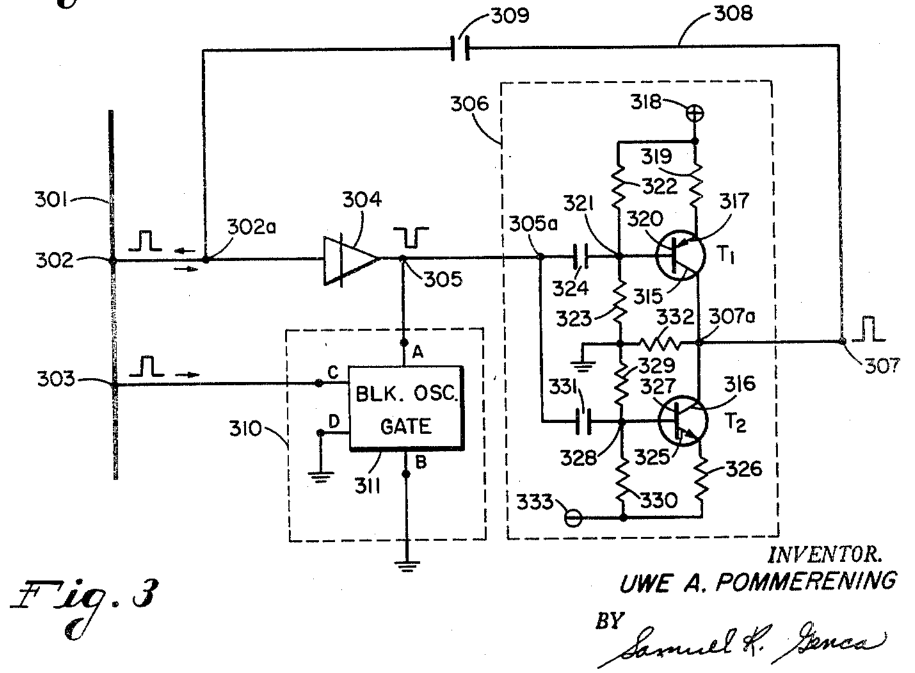
Fig. 3
INVENTOR.
UWE A. POMMERENING
BY Samuel R. Genca
AGENT Sept. 29, 1964 U. A. POMMERENING 3,151,300

NEGATIVE IMPEDANCE CIRCUIT

Filed Aug. 6, 1962 2 Sheets-Sheet 2

3,151,300
Patented Sept. 29, 1964

United States Patent Office 3,151,300

NEGATIVE IMPEDANCE CIRCUIT

Uwe A. Pommerening, Webster, N.Y., assignor to General Dynamics Corporation, Rochester, N.Y., a corporation of Delaware Filed Aug. 6, 1962, Ser. No. 214,934
5 Claims. (Cl. 330—51)

The present invention relates generally to signal amplifying circuits and more particularly to negative impedance circuits.

Although the present invention is suited for more general application, it is particularly adapted to function as a negative impedance repeater for a telephone system and more specifically for a time division multiplex telephone system.

Prior art negative impedance repeaters to provide gain in a telephone transmission line are well known. A negative impedance repeater may be of the series type or the shunt type being inserted in series with or placed in shunt with the telephone transmission line to compensate for or to make up transmission losses thereover. A series repeater increases the original line current therethrough, while a shunt repeater increases the original line potential thereat. Prior art negative impedance repeaters operate at audio frequencies and fixed transmission line impedances. The fixed impedance of the transmission line may be adjusted in some cases to the impedance of the repeater, or the impedance of the repeater may be adjusted to the impedance of the transmission line. In either case, the negative impedance repeater sees a fixed transmission line impedance.

With the advent of high-speed time division multiplex telephone systems, a pressing need has arisen for a negative impedance repeater to compensate for transmission losses or to provide gain in a time shared common transmission line or highway. In a time sharing or time division multiplex telephone system, information is transferred from one locality or station to another station in a manner which permits the simultaneous exchange of information between each one of a plurality of communicating terminals and a corresponding one of a remote plurality of terminals over a common transmission line or highway. Such systems require that in successive and may be used by other pairs of terminals which are arranged to be in communication with each other be assigned a cyclicallly recurring discrete time slot during which information or amplitude modulated signal pulses be received and sampled. During the relatively long interval between the cyclically recurring discrete time slots, the common transmission line or highway is available and may be used by other pairs of terminals which are arranged to be in communication with others and they may use a channel on the highway during their cyclically recurring discrete time slot to transfer information therebetween. The common transmission line or highway has a varying impedance. There exists a low impedance on the highway during a time slot, that is, the time in which information is being sampled, and a high resistance exists during the time interval between time slots, often referred to as the guard time.

The operating frequency of a time division multiplex system depends on the amount of traffic and the response of the various components of the system. Operating frequencies may be selected at 8 kc. which is twice the frequency of the highest voice frequency in telephone transmission; however, many systems operate at 10 kc.

Accordingly, it is an object of the present invention to provide a novel negative impedance circuit.

It is another object of the present invention to provide a negative impedance circuit which is particularly adapted for time division multiplex telephone systems.

It is still another object of the present invention to provide improved signal transmission in a time division multiplex telephone system.

It is yet another object of the present invention to compensate for the transmission losses in a telephone system transmission line having a varying impedance.

It is a specific object of this invention to provide accurate reproduction and amplification of signal pulses which are separated by guard pulses.

In a time division multiplex telephone system, signal hangover from one time slot onto the next time slot, commonly termed "crosstalk," is chiefly caused by energy stored in the distributed capacitance of the transmission line or highway. It is important, therefore, that the signal on the highway be amplified only during a time slot since amplification of the signal hangover on the highway during the guard time would distort the signal in an adjacent time slot. Crosstalk constitutes a major problem in time division multiplex telephone systems.

Crosstalk is largely a reactive effect. The magnitude of the cross-talk tends to increase with at least the following factors: first, the length of the paralleling circuits, the strength of the energy level of the transmitted circuit, and the frequency of the transmitted circuit. It follows that the use of telephone repeaters is likely to increase the crosstalk possibilities because these devices permit larger current and at the same time increase the level of the energy at certain points along the transmission line or highway.

Accordingly, it is an object of the present invention to reduce crosstalk in a time division multiplex telephone system while still providing signal amplification during a time slot.

Briefly, the present invention accomplishes the above-cited objects by providing a negative impedance circuit connected to a source of amplitude modulated pulses which are separated by guard pulses. The negative impedance circuit comprises first and second amplifier stages, a regenerative or positive feedback path interconnecting the output of the second amplifier with the input of the first amplifier stage and a gate circuit interposed between the first and second amplifier stages.

Further included are means for enabling the gate circuit in response to each guard pulse. The gate circuit diverts the output of the first amplifier stage away from the input of the second amplifier stage, whereby the overall gain of the first and second amplifier stages is reduced to substantially zero gain for the duration of the guard pulse.

Although the features of the invention which are believed to be novel are set forth wtih particularity in the appended claims, these and other objects of the invention as well as its organization and method of operation can best be understood by referring to the accompanying drawings, in which:

FIG. 1 is a schematic circuit diagram using logic symbolts illustrating a negative impedance circuit in accordance with the invention;

FIG. 2 is a circuit diagram of an amplifier stage used in the schematic circuit diagram in FIG. 1;

Figure 4:
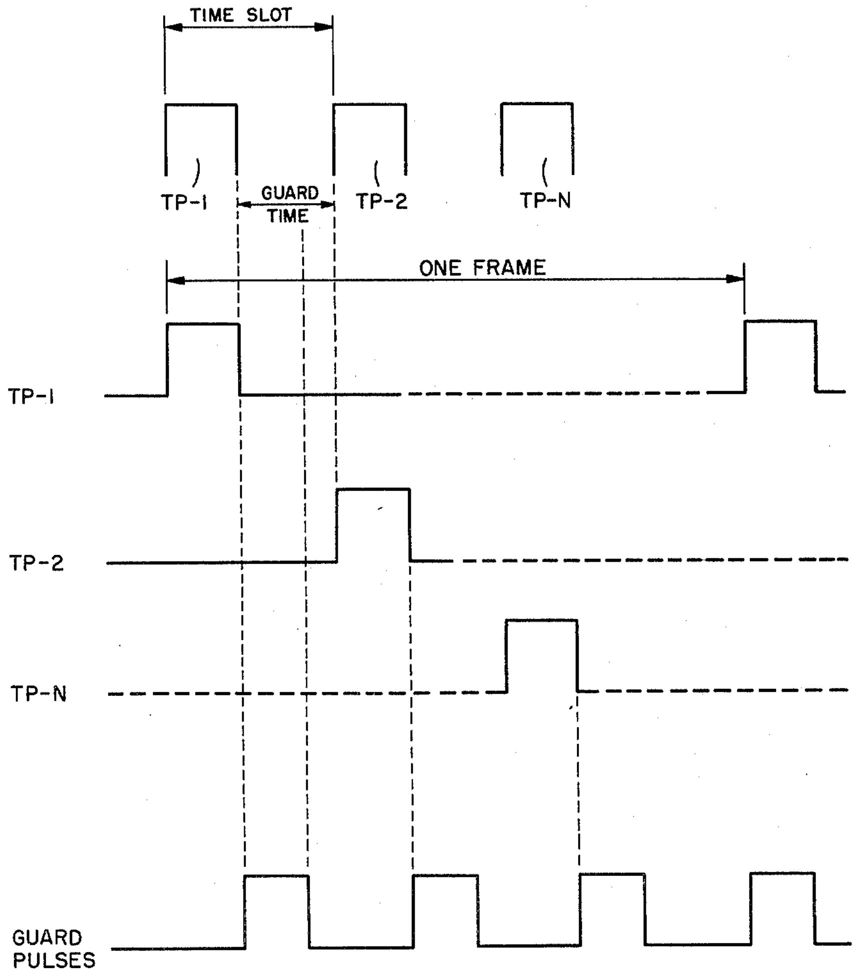

FIG. 3 is a circuit diagram which shows an alternative arrangement of the negative impedance circuit of FIG. 1 connected to a time shared highway of a time division multiplex telephone system; and FIG. 4 is a pulse chart which shows the time relationship of the time defining pulses in a time division telephone system shown as TP1, TP2 and TPN, and guard pulses utilized to control the negative impedance circuit.

In this specification, a block of reference numerals have been reserved for each figure with the initial digit of each reference number being the number of the figure to which it is assigned. Thus, reference numerals 100–

199 are assigned to FIG. 1, 200–299 to FIG. 2, etc. This system enables the reader when he sees a given reference number in the text to go directly to the particular figure in the drawing where the numeral first appeared.

Referring now to FIG. 1, there is illustrated in block diagram form a negative impedance circuit 100 embodying the present invention. The negative impedance circuit is a two-terminal active network which may exhibit negative resistance, negative capacitive or negative inductive reactance. The input and output to the negative impedance circuit is shown by terminals 101 and 102. Terminal 101 is connected to ground. A lead connects terminal 102 to junction 103 that is connected to a first amplifier stage 104. The other side of the first amplifier stage 104 is connected to junction 105. The junction 105 is connected to a second amplifier stage 106. The other side of the second amplifier stage 106 is connected to junction 107 which interconnects the first and second amplifier stages 104 and 106, respectively, by a regenerative or positive feedback path 108 through junction 103. Positive feedback path 108 includes an impedance 109. The junction 105 is also connected to a gate circuit 110 through to ground.

The gate circuit 110 includes a variable resistor 111 and a pulse operated electronic gate 112, such as a blocking oscillator gate, BOG, 112, shown and described in Patent No. 2,933,564, J. G. Pearce et al., issued April 19, 1960, and assigned to the present assignee of the present invention. The blocking oscillator gate as shown in the J. G. Pearce et al. patent comprises a diode bridge in which the individual diodes of the bridge are normally biased in the reversed direction so as to present the very high impedance and thus prevent the transfer of energy between terminals A and B. The bridge diodes are biased in the forward direction to present a very low impedance and thus permit the transfer of energy between terminals A and B only when the blocking oscillator transistor, not shown, is conductive. The blocking oscillator transistor may be triggered into conduction by the trailing edge of a square-wave pulse, such as a time defining pulse applied to terminals C and D, and the time constant of the blocking oscillator gate is such that the transistor is conductive and the bridge diodes are biased in the forward direction to apply ground potential to the gate circuit 110 for a predetermined time period. The time period may be .6 of a microsecond as specified in the J. G. Pearce et al. patent. The blocking oscillator gate 112 presents a very low impedance during conduction.

The first and second amplifier stages 104 and 106 may be any one of the well known amplifiers in which the input signal and output signal are 180 degrees out of phase. The first and second amplifier stages 104 and 106, respectively, may be of a preferred type illustrated in FIG. 2. The amplifier of FIG. 2 will be explained more in detail after the operation of the negative impedance circuit is described.

In the operation of the negative impedance circuit, power is applied to terminals 101 and 102 during a time position defining pulse. Current flowing through the first amplifier stage 104 is amplified and undergoes a phase reversal of 180 degrees and is applied to junction 105. During the same time position defining pulse, current is applied from junction 105 to the second amplifier stage whence it is further amplified and undergoes another phase reversal of 180 degrees. Since the phase relationship of the current input to the first amplifier stage 104 is the same as the current output of the second amplifier stage, positive feedback through path 108 is achieved. The current through the feedback path 108 is applied to the junction 103 where a small portion of the amplified current is fed back to the first amplifier stage 104 and the remaining portion is applied to terminals 101 and 102.

In accordance with the invention, the gate circuit 110 controls the gain of the negative impedance circuit. The blocking oscillator gate 112 is enabled in response to the trailing edge of the time defining pulse obtained at terminals C and D from the pulse source. Let it be assumed that the adjustable resistor 111 is set so that there is no resistance across terminal B and ground. Now, in response to the trailing edge of each time defining pulse, the low impedance blocking oscillator gate 112 places the junction 105 at ground potential. The current output from the first amplifier stage 104 is diverted away from the second amplifier stage 106 and discharged to ground. Since no current is transferred to the second amplifier stage, the net output of the first and second amplifier stages 104 and 106 is reduced to substantially zero. Thus the negative impedance circuit is prevented from going into oscillations and no current or energy is fed back to the terminals 101 and 102 during the trailing edge of each time defining pulse.

Now, let it be assumed that the adjustable resistor 111 is set to a predetermined resistance value. When current or power is applied to terminals 101 and 102, the negative impedance circuit 100 will provide the same gain during the time defining pulse, as was explained in the preceding paragraph. However, during the trailing edge of each time position defining pulse, the blocking oscillator gate 112 is enabled closing the circuit from junction 105 through adjustable resistor 111 to ground. The gate circuit 110 is now paralleled to the second amplifier stage 106. The current at junction 105 can now be diverted through resistor 111 to ground and partly through the second amplifier stage. The current output from the second amplifier stage 106 is routed through the feedback path 108 back to junction 103. The gain of the negative impedance circuit will now be proportional to the current applied to the second amplifier stage 206. Thus, the over-all gain of the negative impedance circuit may be adjusted by resistor 111.

FIG. 2 shows a preferred transistor amplifier stage 200 which can be used in either or both of the first and second amplifier stages 104 and 106, respectively, of the negative impedance circuit of FIG. 1. Shown at 201 is an input terminal connected to one side of a direct current blocking capacitor 202. The other side of the direct current blocking capacitor 202 is connected to a voltage divider comprising resistors 203 and 204 connected at junction 205. Resistor 204 is connected to a source of negative potential, while resistor 203 is connected to a ground reference potential or positive potential. Junction 205 is also connected to the base 206 of P-N-P transistor 207. Transistor 207 includes a collector 208 and an emitter 209. The emitter 209 is connected to ground through a phase control impedance 210 comprising a resistor 211 and capacitor 212 connected in parallel. It should also be noted that the phase control impedance may comprise other reactive components, such as a resistor and inductor, and therefore should not be limited to only a resistor and capacitor. The collector 208 is connected to junction 213. Junction 213 connects to a collector resistor 214 through to a source of negative potential 215. An output terminal 216 connects to the junction 213.

An N-P-N transistor can be substituted for the P-N-P transistor 207 by changing the polarity of the potential source in a manner well known to those skilled in the art.

The transistor amplifier of FIG. 2 is a common emitter amplifier commonly referred to as a grounded emitter amplifier having voltage divider biasing.

The collector 208 of the P-N-P transistor 207 is at the highest negative potential and the emitter is at the highest positive potential or ground. Structurally, the base is between the two and therefore the voltage of the base assumes a voltage between the two potentials. The base is less positive than the emitter, or, in other words, negative with respect to the emitter.

In operation, the common emitter amplifier of FIG. 2 operates as a Class A amplifier. The input signal voltage is reversed 180° in going through the common emitter amplifier of FIG. 2. This may be seen when an input signal voltage raises the potential level at junction 205, so that the forward bias is more positive in the base emitter circuit. The resultant forward voltage at this instant is increased, thereby increasing the total current flow through the emitter 209. By corresponding amounts, the collector and base currents are increased. The increased current flow through collector-resistor 214 causes the lower part of the collector-resistor 214 to become less negative (more positive) with respect to the upper part of the collector-resistor 214. For the entire half-cycle that an input signal voltage goes positive, the output signal goes negative. For the entire half-cycle that the input signal goes negative and lowers the potential at junction 205, the output signal voltage goes positive.

In accordance with the invention, the phase control impedance 210 may vary the signal voltage phase angle by the capacitor 212.

FIG. 3 shows a modified negative impedance circuit in accordance with the invention connected at a junction 302 to a common transmission line or highway 301 of a time division multiplex telephone system. The time division multiplex telephone system may be of the type shown and described in U.S. Patent application Serial No. 45,342 by Barrie Brightman, filed July 26, 1960, and assigned to the same assignee as the present invention.

A typical time division multiplex telephone system includes a plurality of communicating circuits that are connected to a common signal transmission line or highway, such as 301, through a plurality of signal responsive gates, not shown. These gates are opened and closed at distinct time positions in a repetitive time frame under the control signals supplied thereto. Each of the time frames is divided into a plurality of distinct time slots. The time relationship between the time position defining pulses and control or guard pulses is graphically illustrated in FIG. 4 of the drawings. In general, all of the switching operations of the system are synchronized by a common pulse generator and a clock pulse source that provides time position defining pulses at a predetermined frequency.

The modified negative impedance circuit of FIG. 3 shown connected to the highway 301 at junction 302 receives signals during time position defining pulses, such as TP1, TP2 and TPN, shown in FIG. 4. The time position defining pulses are also simultaneously applied to junction 303 of the negative impedance circuit. A lead connects junction 302 to junction **302*a* that is connected to a first amplifier stage 304, similar to that shown in FIG. 1. The other side of the first amplifier stage 304 is connected to a junction 305. The junction 305 is connected to junction 305*a* and a second amplifier stage 306. The other side of the second amplifier stage is connected to junction 307 which interconnects the first and second amplifier stages 304 and 306, respectively, through a regenerative or positive feedback path 308 to junction 302*a*. The positive feedback path 308 includes capacitor 309. The junction 305 is also connected to a gate circuit 310** to ground.

The gate circuit 310 includes a low impedance gate, such as blocking oscillator gate 311, to ground. The blocking oscillator gate 311 includes control terminals C and D. Control terminal C is connected to junction 303, while control terminal D is connected to ground.

The second amplifier stage 306 comprises a push-pull amplifier having a P-N-P transistor T1 and an N-P-N transistor T2, each having a collector 315 and 316, respectively, connected to a common output junction **307*a*. P-N-P transistor T1 includes an emitter 317 connected to a source of positive potential 318 through a resistor 319 and a base 320 connected at junction 321 to a voltage divider. The voltage divider at junction 321 comprises resistors 322 and 323. The other side of the voltage divider is connected to a direct current blocking capacitor 324 and to junction 305*a***.

N-P-N transistor T2 includes an emitter 325 connected to a source of negative potential 333 through a resistor 326. Transistor T2 further includes a base 327 connected at junction 328 to a biasing voltage divider comprising resistors 329 and 330. The other side of the voltage divider is connected to a direct current blocking capacitor 331 and to junction **305*a*. Thus the base and emitter of P-N-P transistor T1 is included in a circuit comprising resistors 319, 322 and 323, while the base and emitter and N-P-N transistor T2 are in a circuit including resistors 326, 330 and 329. A load resistor 332 is common to collectors 315 and 316 of transistors T1 and T2, respectively. The output of transistors T1 and T2 is at junction 307*a***.

The operation of the negative impedance in FIG. 3 can best be explained with reference to FIG. 4. During time position defining pulse TP1, the signal voltage is applied to junctions 302 and 303. The signal voltage is amplified in the first amplifier stage 304 and undergoes a phase reversal of approximately 180° and is applied to junction 305. During the same time position defining pulse, the signal voltage is applied to the second amplifier stage 306 at junction **305*a*. The signal voltage turns on transitsors T1 and T2, and by transistor action the signal voltage appearing at junction 305*a* is amplified and undergoes another phase reversal so that the signal voltage at junction 307*a* is in phase with the signal voltage at junction 302. The signal voltage is fed over feedback path 308 to junction 302*a*. Capacitor 309 controls the gain and phase angle between the first and second amplifier stages 304 and 306. The signal voltage now amplified at junction 302*a* is now reapplied to the highway 301, thus compensating for any losses incurred over the highway 301**.

During the same time slot or time position defining pulse TP1, the blocking oscillator gate 311 presents a high impedance so that all the voltage appearing at junction 305 is directed to the second amplifier stage 306. However, during the trailing edge of the time position defining pulse, the bridge diodes, not shown, in the blocking oscillator gate 311 are biased in the forward direction to present a very low impedance, and thus permit the transfer of energy between terminals A and B. The time constant of the blocking oscillator gate 311 is such that the transistor, not shown, is conductive and the bridge diodes are biased in the forward direction to apply ground to the gate circuit for a predetermined time period, as shown by the guard pulse in FIG. 4. Thus, any residual signal voltage from the first amplifier stage 304 is directed away from the second amplifier stage 306. Since the second amplifier stage 306 includes two transistors T1 and T2 which operate in Class B, no current flows in transistors T1 and T2 when no signal is applied thereto. This no-current condition is due to the transistors T1 and T2 being biased to cutoff.

In accordance with the invention, the impedance 109 of FIG. 1 may be selected to compensate for the capacitive reactance of the highway and thus reduce crosstalk over the highway.

While there have been described what are at present considered to be the preferred embodiments of the invention, it will be understood that various modifications may be made therein which are within the true spirit and scope of the invention as defined in the appended claims.

What is claimed is:

1. The combination comprising a line for transmitting successive amplitude-modulated signal pulses separated by guard pulses and a negative impedance repeater circuit coupled to said line for amplifying said signal pulses, said circuit including a first amplifier stage having an input circuit and an output circuit, a second amplifier stage having an input circuit and an output circuit, means coupling the input circuit of said first amplifier stage to said line for applying each of said signal pulses on said line as an input to said first amplifier stage, means coupling the output circuit of said first amplifier stage to said input circuit of said second amplifier stage for applying the output of said first amplifier stage as an input to said second amplifier stage, means coupling the output circuit of said second amplifier stage to said line for applying to said line amplified signal pulses which are in phase with the signal pulses applied from said line to the input circuit of said first amplifier stage, and a gate circuit for selectively diverting the output of said first amplifier stage from the input of said second amplifier stage, said gate circuit including impedance means having a low impedance relative to both the impedance of the output circuit of said first amplifier stage and the input circuit to said second amplifier stage, means including a normally open switch for selectively coupling said impedance means effectively in shunt with the output circuit of said first amplifier stage and the input circuit of said second amplifier stage in response to the closure thereof, and means responsive to each guard pulse for operating said switch to effect the closure thereof for the duration of that guard pulse.

2. The combination defined in claim 1 wherein the impedance of said impedance means is negligible, whereby said second amplifier stage produces no output for the duration of each guard pulse.

3. The combination defined in claim 1 wherein said impedance means consists of a predetermined resistance, whereby the output of said second amplifier stage for the duration of each guard pulse is reduced with respect to the output therefrom during each signal pulse by an amount determined by the value of said predetermined resistance.

4. The combination defined in claim 1 wherein said first amplifier stage is a single-ended class A amplifier stage and said second amplifier stage is a push-pull class B amplifier stage.

5. The combination defined in claim 4 wherein said second amplifier stage comprises a P-N-P first transistor and an N-P-N second transistor.

References Cited in the file of this patent

UNITED STATES PATENTS 2,681,989 Gunniff ---------------- June 22, 1954
2,756,328 Braak ----------------- July 24, 1956